United States Patent [19]
Cantaloube et al.

[11] Patent Number: 5,509,440
[45] Date of Patent: Apr. 23, 1996

[54] DEVICE FOR CUTTING A PIPE IN ORDER TO STOP A FLUID FLOW

[75] Inventors: Elie Cantaloube; Yves Cantaloube, both of Laissac, France

[73] Assignee: Societe Civile d'Invention Pour la Gestion des Brevets Cantaloube, Laissac, France

[21] Appl. No.: 193,156

[22] PCT Filed: Aug. 13, 1992

[86] PCT No.: PCT/FR92/00792

§ 371 Date: Feb. 9, 1994

§ 102(e) Date: Feb. 9, 1994

[87] PCT Pub. No.: WO93/04312

PCT Pub. Date: Mar. 4, 1993

[30] Foreign Application Priority Data

Aug. 13, 1991 [FR] France .................................. 91 10290

[51] Int. Cl.⁶ .............................. F16L 55/10; F16L 55/18
[52] U.S. Cl. .................. 137/318; 30/94; 83/745; 83/829; 138/97
[58] Field of Search ............................ 137/15, 315, 318; 30/94, 95, 389; 83/54, 491, 745, 821, 829; 138/93, 94, 97

[56] References Cited

U.S. PATENT DOCUMENTS

| | | | |
|---|---|---|---|
| 1,989,768 | 2/1935 | Nieman | 137/318 |
| 2,972,363 | 2/1961 | Santilli | 30/389 |
| 2,984,129 | 5/1961 | Allen | 137/318 |
| 3,108,499 | 10/1963 | Duncan | 137/318 |
| 3,227,011 | 1/1966 | Larry | 137/318 |
| 3,603,387 | 9/1971 | Schoeffler | 137/318 |
| 3,650,547 | 3/1972 | Tickett | 137/318 |
| 3,652,107 | 3/1972 | Tickett | 137/318 |
| 3,703,906 | 11/1972 | Tickett | 137/318 |
| 3,735,775 | 5/1973 | Tickett | 137/318 |
| 3,797,354 | 3/1974 | Allison | 30/389 |
| 4,370,995 | 2/1983 | Smith | 137/318 |
| 4,516,598 | 5/1985 | Stupak | 137/318 |

*Primary Examiner*—George L. Walton
*Attorney, Agent, or Firm*—Young & Thompson

[57] ABSTRACT

Device for cutting a pipe (1) transporting fluid in order to stop the circulation of the fluid at any point, comprising a casing (2, 3) susceptible of being sealingly mounted on the pipe (1). The casing (2, 3) contains at least one blade (8) which is driven in rotation and feed motions so as to cut off the pipe (1) by sawing it transversely. The blade (8) forms a stop surface to the circulation along the section plane of the saw blade. The device is useful in the cutting of fluid flow in pipes and particularly in the case of accidents such as fires in oil wells.

5 Claims, 2 Drawing Sheets

DEVICE FOR CUTTING A PIPE IN ORDER TO STOP A FLUID FLOW

FIELD OF THE INVENTION

The present invention relates to a device making it possible to intervene on pipes of all types, such as tubes, pipes, pipelines and other conduits ensuring transport of fluids at any temperatures and pressures, so as to ensure stop of the circulation at any point, particularly in the event of a serious incident, ensuring total tightness during the whole operation of positioning, cutting of the pipe and closure.

Of course, such devices find their applications in all emergency cases where safety must be established after an accident, explosion, fire, attack or any other case where the stop of the flow in a pipe can no longer be mastered.

BACKGROUND OF THE INVENTION

The prior art discloses devices of this type: for example, U.S. Pat. No. 3,603,387 (SCHOEFFLER) describes a device for cutting a pipe, which may be controlled at a certain distance and presenting a casing surrounding the pipe, a saw blade rotating and advancing in the casing, provided with an abrasive disc which flattens the section of the conduit, on the upstream side, to ensure tightness thanks to members of the jack type which urge the blade upstream against the thrust of the fluid circulating in the conduit to apply the blade against the upstream section of said pipe and ensure tightness. This device presents the major drawback of obliging the blade to withstand the fluid pressure whilst it rests only punctually on the jacks, which work under full load, with the result that failure of any one of the jacks may bring about rupture of the assembly.

The devices according to the invention find in particular their applications in the case of oil wells on fire. In the prior art, in this latter case, use is firstly made of devices for extinguishing by blowing, particularly by explosion, to extinguish the fire, then one generally intervenes by lateral drillings to deviate the flux towards another new zone presenting all the equipment necessary for mastering the flow.

In the general case of pipes, one generally intervenes upstream of the zone where the incident occurs, at the place where the first valve or other device for stopping the flow is located, but this does not prevent the flow of all the fluid located between the zone where the incident occurs and the zone where closure may be ensured.

In any case, it is important to be able to stop as rapidly as possible the flow of fluid at the place closest possible to the zone where the incident occurred, insofar, of course, as the exterior conditions of temperature and of pressure allow the necessary operators to approach. As will be seen hereinafter, it is obviously possible to provide placing of the devices of the invention prior to the incident, which is possible in those cases where it is desired to modify an installation, for example, for introducing a derivation or complementary branch on a pipe.

It is also possible to envisage automatic placing with the aid of remotely controlled or numerically controlled or like robots, effecting the same operations as the operators, as will be described hereinbelow.

SUMMARY OF THE INVENTION

The present invention relates in particular to a device for cutting a pipe transporting fluid in order to stop the circulation at any point, characterized in that it comprises a casing capable of being tightly mounted on said pipe, said casing containing at least one blade driven in rotation and advancing so as to saw the pipe transversely, said blade constituting a surface for stopping said circulation along the plane of section by the saw blade.

BRIEF DESCRIPTION OF THE DRAWINGS

In order better to understand the technical characteristics and advantages of the present invention, examples thereof will be described, it being understood that they are non-limiting as to their embodiment and the applications that may be made thereof. Reference will be made to the following Figures, which show.

DETAILED DESCRIPTION OF THE INVENTION

Figure 1:
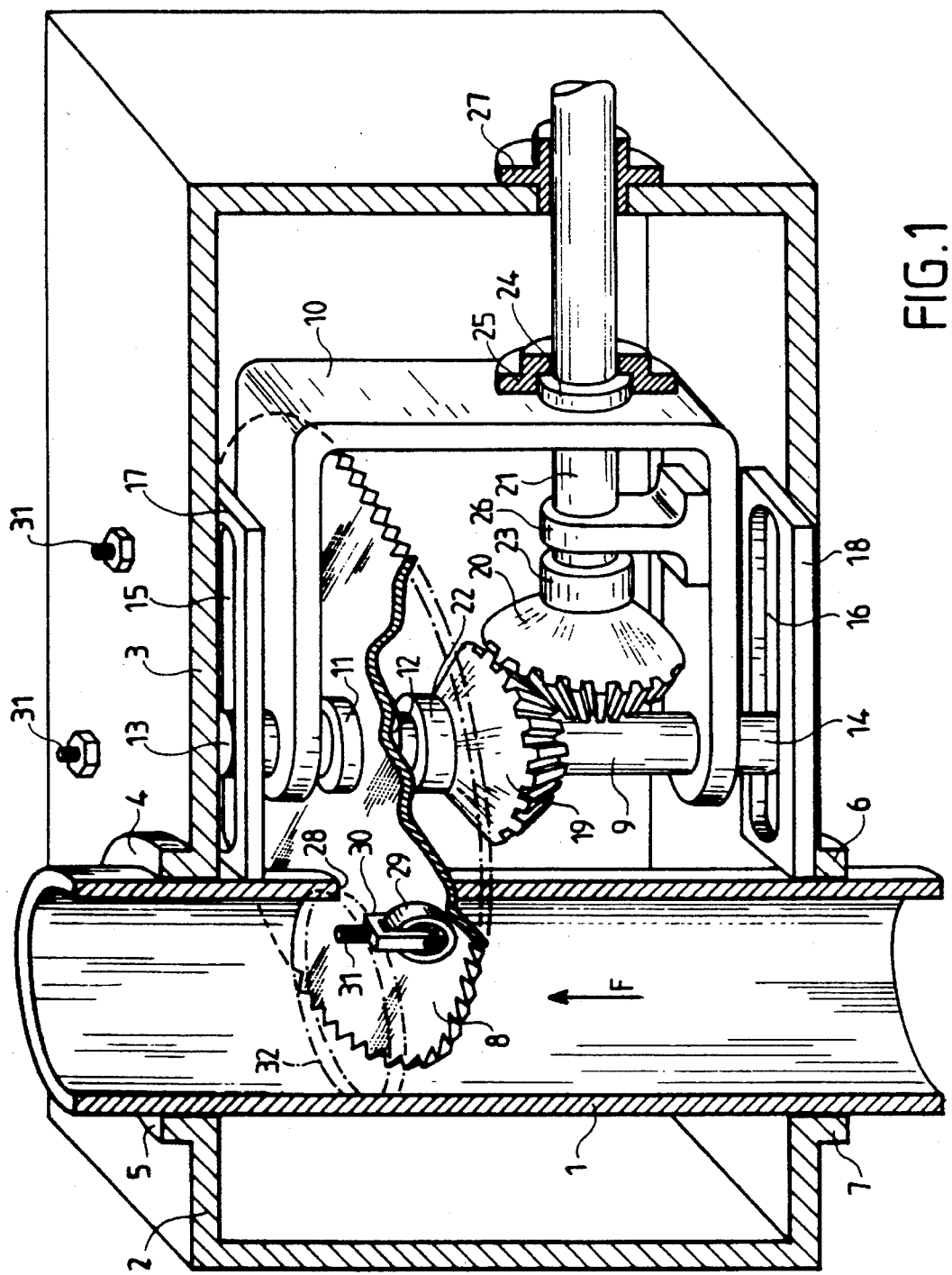
FIG. 1, a perspective view, with parts torn away, of a device according to the present invention.

In a first embodiment for which reference will be made to FIG. 1, the conduit is designated by reference 1. This conduit may be made of any material and in particular of metal, alloy or plastics material. The essential of the device is included in a casing comprising two parts 2 and 3 which are assembled on either side of the conduit 1 thanks to devices such as flanges 4, 5, 6 and 7 which are fixed to the conduit 1 by any adequate means which will essentially depend on the pressures coming into play and the nature of the materials. One may make do with clamping collars or fixing bolts, but, in the case of high pressures, the two parts 2 and 3 of the casing may also be welded together and, if necessary, on the conduit 1. The assembly of the casing formed by the two elements 2 and 3 is, for example, generally of parallelepipedic form, without this constituting a necessity since it essentially suffices to protect the assembly of the mechanism which will be described hereinbelow and to ensure seal.

The essential element of the device is constituted by a circular saw 8 rotating about an axis materialized by shaft 9, preferably parallel to the axis of the conduit 1. In certain cases, a shaft 9 may also be envisaged which is not parallel to the axis of the conduit 1 which, instead of causing the circular saw to describe a straight plane of section as in FIG. 1, may cause it to describe an inclined plane. Such arrangements may be chosen by the man skilled in the art as a function of the characteristics of the fluid, i.e. its pressure, its different characteristics of velocities, its viscosity, its nature, etc . . . The shaft 9 is mounted to rotate in a U-forked piece 10, provided with the necessary bearings (not shown in the Figure). The circular saw 8 is fixed on the shaft 9 by any adequate means such as conventional collars 11 and 12 or by any other means such as those set forth hereinafter. The ends 13 and 14 of the shaft 9 pass through the two arms of the U-piece 10 to penetrate in the oblong openings 15 and 16 of two pieces 17 and 18 fixed on part 3 of the casing on either side of the U-piece 10. Consequently, when the U-piece 10 is animated by a movement of translation, as will be seen hereinafter, the ends 13 and 14 of the shaft 9 slide in the openings 15 and 16, which allows a progressive advance in translation of the circular saw 8 rotating on its axis 9 through conduit 1, as shown in FIG. 1. The circular saw 8 and the shaft 9 are driven in rotation, in accordance with a preferred embodiment of the invention, by conical gear wheels 19 and 20 respectively fixed on the shaft 9 and on a tranvserse shaft 21 thanks to adequate means such as internal longitudinal flutings of the conical gear wheels in mesh with-corresponding outer flutings of shafts 9 and 21. The fact that these gear wheels mesh makes it possible, thanks to the rotation of the shaft 21 driving that of gear wheel 20, to drive gear wheel 19, the shaft 9 and the circular saw 8 fixed by the ring 11. To prevent the shaft 21 from moving in translation with respect to the U-piece 10, it presents a widened part or a ring 24 maintained in position against the U-piece 10 thanks to a cap 24 fixed on the U-piece 10 by any adequate means. The piece 10 and the cap 25 are provided with any lubrication device or bearing, not shown in the single Figure, by simplification. For the shaft 21 to remain in position in the U-piece 10, a bearing 26 may be provided, fixed on one of the wings of the piece 10 by any adequate means in the vicinity of gear wheel 20. This guiding also plays an important role in the translation of the U-piece 10 and of all the mechanism which has been described during advance of the circular saw 8 through conduit 1. In fact, it avoids the piece 10 moving in a movement which is not a simple translation, it also allows the shaft 21 to remain in correct position with respect to the shaft 9, i.e. preferably their axes remain concurrent, the gear wheels 19 and 20 remaining correctly meshed to ensure perfect drive of the shaft 9 and of the circular saw 8. The shaft 21 passes through part 3 of the casing thanks to a bearing ring 27.

Shaft 21 must be driven in rotation by any conventional motor. It must also be able to be displaced in translation so as to ensure advance of the piece 10, of the mechanism that it supports and of the circular saw 8 which must traverse the whole section of the conduit 1. To ensure both the movement of rotation and of translation, it is possible to provide between the motor (not shown in the Figure) and the shaft 21, a sliding drive by fluting or equivalent, a shoulder or a ring fast with the shaft 21 allowing any conventional device, for example of the jack type, to ensure progressive advance of the mobile equipment.

As has been indicated hereinabove, it is obvious that the man skilled in the art will choose materials and dimensions which will essentially depend on the nature and characteristics of the conduit 1 as well as on the nature and physico-chemical characteristics of the fluid which moves therein. Concerning the casing 2, 3, it may be made for example of welded steel sheet and fixation of the two parts 2 and 3 together as well as their fixation on the conduit 1 may be effected as has been stated above or, in accordance with a preferred embodiment of the invention, by replacing the half-flanges 4, 5, 6 and 7 by circular rings of square sections added on the parts 3 and 4. The dimensions and in particular the thicknesses of these different elements will obviously essentially depend on the pressures and stresses coming in play.

Concerning the circular saw 8, it is preferably mounted on the shaft 9 made of mild steel and the ring 11 may take the form of a cylindrical stiffener ensuring a good orthogonality between the general plane of the saw 8 and its drive shaft 9. The part designated by 12 is formed by a shoulder of the shaft 9.

If necessary, the circular saw will be chosen with shapes of teeth which are set only on the side which receives the pressure of the fluid which, in FIG. 1, moves in the direction of arrow F. In FIG. 1, the teeth have been shown very schematically. The teeth must therefore preferably be set on the upstream side of the fluid, whilst, on the downstream side, the surface of the blade must be totally plane so as to be applied under the effect of the pressure against the part 28 of the conduit 1 which has been sawn, which ensures tightness between upstream and downstream. It is, of course, possible that part of the fluid passes in the casing 2 and 3, particularly if its viscosity is very low and the choice of the materials used, the sealing device and lubrication or self-lubrication must take into account the nature of the fluid.

When all risks of abnormal movements of the steel tubes are set aside, it appears preferable, according to a preferred embodiment of the invention, to use a saw 8 with normal teeth, virtually without notch in the upstream part so as to reduce the penetration of the fluid in the casing 2 and 3.

It is obvious that the thickness of the circular saw must take into account the pressure, the velocities, the viscosity of the fluid and the inner diameter of the conduit 1. When the hydraulic stresses are high, it is, of course, necessary to increase the thickness of the saw 8 which may take the appearance of a mill, but, bearing elements may also be provided, such as ball bearings such as the one designated by 29, mounted in a fork 30 fixed on the wall of the part of the casing 2 or 3, for example by bolting 31. Thrust ball bearings may also be provided, with axes parallel to axis 9 and interposed between the circular saw 8 and the wall 3 with the aid of possible shims.

The ball bearings may be replaced by any roller devices or other simpler systems, possibly with friction, insofar as a device such as the one forming the subject matter of the present invention may have to serve only once, which may therefore lead the man skilled in the art to choose more robust solutions for the duration of the intervention. Elements such as forks 30 may be fixed to the upper part of the casing elements 2 and 3 thanks, for example, to the bolting system 31, a cap covering each bolt so as to ensure seal since, as has been underlined hereinabove, it is especially possible, with a fluid of low viscosity, that it penetrates in the chamber constituted by the two casing elements 2 and 3, which places the assembly of the casing under a pressure which tends to be equal to that in the pipe 1, which pressure risks increasing all the more so as the closure thanks to the saw is more rapid and the dynamics of the fluid may considerably increase the pressure stresses at the moment of closure. The ends 13 and 14 of the shaft 9 sliding in the oblong openings 15 and 16 of the pieces 17 and 18, the latter will preferably be made of a material easily lending itself to friction, such as bronze, so as to constitute a particularly adequate slideway.

The shaft 9 mounted to rotate in the U-piece forming fork 10 may be so thanks to bearings (not shown in the Figure) which may be simple rings of bronze or other friction alloy.

The system of rings 24 and 25 which ensures non-translation of the shaft 21 with respect to the forked piece 10 allows advance of the mobile equipment, but may also allow withdrawal thereof. These rings may also be made of bronze. The inlet ring 27 of the shaft 21 in the casing part 3 may preferably comprise a stuffing box or other sealing device to withstand the pressure of the fluid which may prevail in the enclosure of the casing.

The device functions as follows: it may, of course, be used as a preventive measure, i.e. mounted at the start on any pipe at risk which may become of difficult access in the event of accident; this is obviously the case when it is question of oil wells which risk having a fire and creating a source of heat such that it is difficult to effect work in the vicinity. In the case of oil wells, it is possible, if the device has not been positioned prior to any exploitation, to approach thanks to a tunnel which is ventilated as one advances so as to have access under the ground at a certain distance from the surface in a zone of more tolerable temperature, which may be improved by a particularly efficient ventilation. An advance of the assembly of the device on a carriage may in that case be provided.

It is obvious that assembly is much simpler when it is a pipe in the open air accessible under normal conditions of outside temperatures and pressures.

One begins by mounting the two casing elements 2 and 3 on the conduit 1 thanks to the flanges 4, 5, 6 and 7 and ensuring fixation of the elements 2 and 3 together and fixation thereof on the conduit 1, as stated hereinabove. In casing element 3 is mounted, at the start, the assembly of pieces 9 to 31. At the start, the casing elements must be disposed so that the circular saw 8 is mounted so that its plane face lies on the downstream side of the circulation of the fluid and that the stop or support elements such as 29, 30, 31 are also on the downstream side in order to maintain the circular saw 8 against the hydrostatic pressure of the fluid represented by arrow F in FIG. 1. The circular saw is at the start in a totally retracted position, i.e. the ends 13 and 14 of the shaft 9 are at the right-hand end of the Figure in the slide blocks 15 and 16. The piece 10 forming U-fork is also totally pushed towards the right in the casing element 3 and the shaft 21 projects to a maximum towards the motor located outside (not shown). Rotation of the motor is triggered off, which drives in rotation the shaft 21, the conical gear wheel 20, the conical gear wheel 19, the shaft 9, the ring 11 and the circular saw 8. The path that the circular saw 8 must take must be greater than the outer diameter of the pipe 1, so that the space located between the periphery of the circular saw 8 and the ring 11 must be greater than this outer diameter of the tube 1. This will also correspond to the distance of advance of the mobile equipment 10 and of all the pieces that it comprises. This therefore defines, moreover, the length of the slide blocks 15 and 16 and the space necessary inside the casing part 3 so as to allow complete advance of the device from the starting position totally to the right in FIG. 1 until the circular saw has totally traversed the tube 1, thus cutting the latter along dotted line 32. It is obvious that, once the device according to the present invention shown in FIG. 1 has arrived to a stop position, i.e. the circular saw blade totally obturates a cross section of the pipe 1, it is possible to re-establish the circulation of the fluid by retracting the assembly of the mobile equipment mounted on piece 10, by retraction of the jacks or other devices having served to ensure arrangement of the assembly. It is therefore possible to leave the assembly of the casing and its contents in place, for example by welding the casing on pipe 1, so as possibly to serve another time at the same place, this time without having to cut the section 32 of conduit 1 again, since the blade consequently serves only as a transverse valve element; however, a rotation may reduce frictions and ensure an easier positioning of the assembly.

Figure 2:
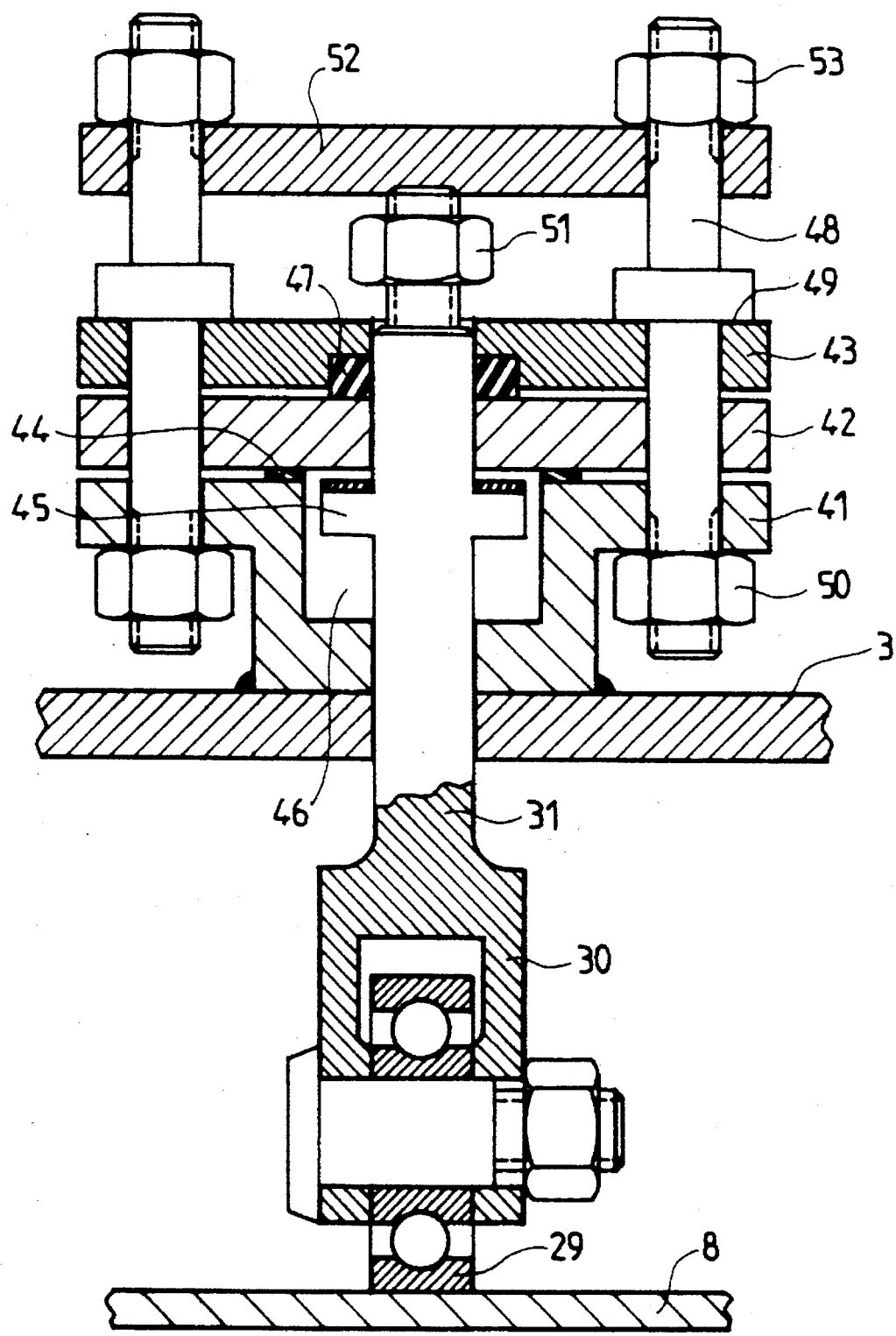
FIG. 2, an axial section on a stop system for a device such as that of FIG. 1.

It is also possible, as shown in FIG. 2, to mount the stops so as to ensure a perfect guiding of the blade during sawing and its orthogonality with respect to the axis of the conduit. The ball or needle bearing roller 29 is mounted to rotate in the stirrup 30, as in FIG. 1, fast with the end of the threaded rod 31. On the casing 3 is welded a piece 41 of generally dish form with peripheral flange and flat bottom. The rod 31 traverses casing 3 and dish 41 as well as two plates 42, and 43. The first plate, 42 is applied against the peripheral flange of the dish 41 thanks to an O-ring 44. The rod 31 also traverses the two plates 42 and 43 and presents a part 45 of wider diameter which forms double shoulder and is imprisoned in the space 46 thus made between dish 41 and plate 42, which limits the movements of slide of the rod 31. It will be noted that dish 41 and plate 42 may be bonded, even welded together. The plate 43 is tightened against plate 42 as will be seen hereinafter, and presents at its center a packing 47 inserted in a corresponding bore surrounding the rod 31. A certain number of threaded rods 48 are disposed around rod 31, parallel thereto, and traverse the flange of the dish 41 and the plates 42 and 43. They present a shoulder 49 which abuts on plate 43 and the assembly is tightened by the nut 50, which ensures tightness around rod 31. The upper part of rod 31 presents a nut 51, and abuts against a plate 52 threaded on the upper parts of the threaded rods 48, on which are screwed the nuts 53. Acting on these nuts 53 make it possible to push roller 29 downwardly, and nut 51 to rise. The stop/support members 29, 30, 31 may therefore move between a position of stop and maintenance of the blade, and a position of release of the blade. It will be imagined that the less thick the saw blade is, the more it is flexible and the better it must be guided thanks to the rollers 29 to ensure a plane sawing. It is obvious that the use of a blade nearer the thick mill avoids flexibility, but, in the phase following sawing, i.e. the one where the blade is applied on the downstream face of the conduit, a certain suppleness may improve the tightness, the pressure of the fluid applying the blade against this sawn downstream face and compensating possible irregularities. In that case, at the end of sawing, the nuts 53 are unscrewed to disengage the rod 31 and the nut 51 is tightened to raise the roller 29.

In a variant of the preceding Example, the following characteristics may be added:

A system, for example of catches and holes, may be provided between the two casing elements 2 and 3 so as to facilitate location when they are placed in position.

In a variant, it is also possible to provide an opening closed by a tight stopping system in one of the elements of the casing so as to fill it with an adequate lubricant before it is made operational, which, of course, limits the inlet of fluid from the conduit 1 towards the enclosure formed by the casing elements 2 and 3.

This opening, provided with a pipe and a valve (not shown in the FIG.), may also serve to evacuate the fluid, particularly with the aid of a pump, in order to avoid its possible rise and thus facilitate repair of the destroyed part out of ground.

It is possible, taking into account the technical characteristics of the conduit 1, that the assembly of the device according to the invention cannot be mounted in overhang on the pipe and that it is necessary to provide props or other adjustable supports to avoid giving the tube unnecessary stresses all the more so that the tube will be cut into two separate elements.

In the case of an oil well presenting a tubing with concentric tubes, at least one drill-guide assembly may be fixed on the casing, which pierces the first tube and the second right through and therefore maintains them in place so that there is no relative displacement between the two during advance of the circular saw and also during withdrawal thereof. This arrangement also makes it possible to avoid, during positioning of an out-of-ground valve on the tubing, the pressure lifting the tube after withdrawal of the blade 8 in the casing 3.

It will also be noted that devices according to the invention may be made for each diameter and/or material of tube, all the more so as there exist precise standards limiting the number of cases. However, such a device provided for a given diameter may be used with smaller tube diameters. It suffices to add to casing parts 2 and 3 half-ring or flange elements welded or fixed by any adequate means, corresponding to the diameter of the tube to be sawn.

We claim:

1. Device for cutting a pipe transporting circulating fluid in order to stop the circulation at any point, comprising a casing capable of being sealingly mounted on said pipe, said casing containing at least one circular saw blade driven in rotation and in translation so as to saw the pipe transversely and divide the circulating fluid into an upstream side and a downstream side, said saw blade constituting a stop surface to said circulation along the plane of a section sawn by the saw blade, said saw blade having teeth disposed on the upstream side of said fluid circulating in the pipe, while on the downstream side said saw blade having a substantially plane downstream surface adapted under the effect of pressure to be sealingly applied on the sawn section of the pipe at the downstream side and thereby ensure fluid tightness between the upstream and downstream sides, and support elements operatively mounted on the downstream side, and in contact with the plane downstream surface of the saw blade to maintain said blade against hydrostatic forces of the fluid circulating in the pipe during the sawing operation.

2. Device according to claim 1, wherein the support elements are disposed in the casing on the downstream side.

3. Device according to claim 2, wherein the support elements are constructed and arranged for movement between a stop position where the plane downstream surface of the saw blade totally obturates a cross section of the pipe, and a release position where the blade is retracted from said cross section.

4. Device according to claim 2, wherein the support elements comprise a roller mounted for rotation on an end of an adjustable sliding threaded rod.

5. Device according to claim 1, applied to a tubing having two concentric tubes, said device further comprising a drill-guide assembly fixed on the casing, said drill-guide assembly constructed and arranged to pierce the first tube and the second right through and to maintain them in position so that there is no relative displacement between the two tubes during advance and during withdrawal of the circular saw blade.

* * * * *